United States Patent
Suzuki

(10) Patent No.: US 8,590,910 B2
(45) Date of Patent: Nov. 26, 2013

(54) TRAILING ARM MOUNTING STRUCTURE

(75) Inventor: Takayuki Suzuki, Hamamatsu (JP)

(73) Assignee: Suzuki Motor Corporation (JP)

( * ) Notice: Subject to any disclaimer, the term of this patent is extended or adjusted under 35 U.S.C. 154(b) by 87 days.

(21) Appl. No.: 13/218,021

(22) Filed: Aug. 25, 2011

(65) Prior Publication Data
US 2012/0056397 A1 Mar. 8, 2012

(30) Foreign Application Priority Data
Sep. 2, 2010 (JP) ................ 2010-196699

(51) Int. Cl.
*B60G 3/12* (2006.01)

(52) U.S. Cl.
USPC ............. 280/124.128; 180/311; 280/124.108

(58) Field of Classification Search
CPC .............................................. B60G 2204/143
USPC ............... 280/124.108, 124.1, 124.11, 781, 280/124.128; 180/311
See application file for complete search history.

(56) References Cited

U.S. PATENT DOCUMENTS

| 4,537,420 | A | * | 8/1985 | Ito et al. ..................... 280/86.75 |
| 5,150,918 | A | * | 9/1992 | Heitzmann ................ 280/86.5 |
| 5,203,585 | A | * | 4/1993 | Pierce ..................... 280/124.116 |
| 5,573,274 | A | * | 11/1996 | Koketsu ........................ 280/781 |
| 6,702,309 | B2 | * | 3/2004 | Cho ......................... 280/124.166 |
| 7,165,777 | B2 | * | 1/2007 | Ziech et al. ............... 280/124.11 |
| 7,575,243 | B2 | * | 8/2009 | Takahashi .............. 280/124.128 |
| 7,896,370 | B2 | * | 3/2011 | An .......................... 280/124.128 |
| 2008/0084047 | A1 | * | 4/2008 | Bluff et al. ................. 280/423.1 |
| 2012/0056397 | A1 | * | 3/2012 | Suzuki ................... 280/124.128 |

FOREIGN PATENT DOCUMENTS

JP 2007131271 A 5/2007

* cited by examiner

*Primary Examiner* — Karen Beck
(74) *Attorney, Agent, or Firm* — Lerner, David, Littenberg, Krumholz & Mentlik, LLP

(57) ABSTRACT

A trailing arm mounting structure is capable of size reduction as well as weight saving of a trailing arm bracket while ensuring mounting rigidity. In the trailing arm mounting structure, a clearance is formed between an outer sidewall of a side member and an inner sidewall of an extended portion of a side sill. In addition, an inner sidewall of a mounting bracket for a trailing arm is attached to an outer sidewall of the side member while the mounting bracket for the trailing arm is disposed in the clearance. An outer sidewall of the mounting bracket for the trailing arm is attached to the inner sidewall of the extended portion of the side sill, and a base end portion of the trailing arm is supported between the inner sidewall and the outer sidewall of the mounting bracket for the trailing arm.

5 Claims, 4 Drawing Sheets

TRAILING ARM MOUNTING STRUCTURE

CROSS-REFERENCE TO RELATED APPLICATIONS

The present application claims the benefit of Japanese Patent Application No. 2010-196699, filed Sep. 2, 2010, the disclosure of which is incorporated by reference herein.

BACKGROUND OF THE INVENTION

1. Field of the Invention

The present invention relates to a trailing arm mounting structure for a trailing arm suspension configured to suspend a wheel of an automobile.

2. Description of Related Art

The members of a pair of a right rear floor side member and a left rear floor side member are usually arranged on a rear lower face of an automobile along a front and rear direction of a vehicle body. Meanwhile, side sills are provided along the front and rear direction of the vehicle body on side lower parts of the vehicle body corresponding to door openings.

In a trailing arm suspension, a base end of a trailing arm is pivotally and swingably supported by a trailing arm bracket having a substantially U-shape, and a tip end of this trailing arm rotatably supports a wheel. A lower end of a buffer device is attached to an intermediate portion of this trailing arm so as to support the trailing arm swingably in the vertical direction. The buffer device is formed of a spring and a shock absorber, and an upper end of the buffer device is attached to a lower face of a side member.

As a structure of the trailing arm suspension described above, there is a structure configured such that the trailing arm bracket is mounted across the lower face of the side member and the side sill. Here, the trailing arm is supported by the trailing arm bracket by way of a support bolt. There is known a related art employing the above-described suspension mounting structure (see Japanese Patent Application Publication No. 2007-131271).

SUMMARY OF THE INVENTION

In the above-described conventional trailing arm mounting structure, the trailing arm bracket is joined to the lower face of the highly rigid side member so as to ensure rigidity for dealing with a load applied from the trailing arm.

However, a distance between a pivot of the trailing arm and a bottom face of the side member is extended in this structure. Accordingly, it is not possible to suppress displacement of the pivot due to the load around the pivot without increasing the rigidity of the trailing arm bracket.

Reduction in displacement of the pivot makes it possible to ensure stability of a rear suspension and thus improve running stability.

Meanwhile, the trailing arm bracket serves as a vibration propagation path from a tire to the trailing arm and to the vehicle body. Accordingly, improving the mounting rigidity provides an advantageous effect to reduce vibration propagation. Hence an effect to reduce noise in a vehicle interior can also be expected.

A position to mount the trailing arm bracket is desirably located in a position close to the center of a rear tire in a vehicle width direction in order to ensure a performance of the rear suspension. This position is located near a side portion of the vehicle body.

Meanwhile, a rear part of a rear side member passes inside a rear wheel house, and a spring seating face of the rear suspension is provided on a rear lower face side of the rear side member.

Accordingly, the side member is located near the side portion of the vehicle body in front of the rear tire and located inside the wheel house beside the rear tire, thereby being formed into a highly bent shape.

Here, the bend of the rear side member incurs deterioration in rigidity of the entire vehicle body and also leads to reduction in a performance of absorbing a load from the rear side, such as breakage at a curved portion and the like.

An object of the present invention is to provide a trailing arm mounting structure which solves the foregoing problem and is capable of achieving size reduction as well as weight saving of a trailing arm bracket while ensuring mounting rigidity.

To solve the aforementioned problem, the present invention provides a trailing arm mounting structure comprising: a trailing arm; and a mounting bracket for the trailing arm, the mounting bracket being configured to swingably support a base end portion of the trailing arm, the mounting bracket being supported by a side member and a side sill of a vehicle body, wherein a clearance is formed between an outer sidewall of the side member and an inner sidewall of the side sill, an inner sidewall of the mounting bracket for the trailing arm is attached to an outer sidewall of the side member while the mounting bracket for the trailing arm is disposed in the clearance, an outer sidewall of the mounting bracket for the trailing arm is attached to the inner sidewall of the side sill, and a base end portion of the trailing arm is supported between the inner sidewall and the outer sidewall of the mounting bracket for the trailing arm.

In addition, according to the present invention, in the trailing arm mounting structure, the mounting bracket for the trailing arm is formed into a substantially U-shape by using the inner sidewall, the outer sidewall, and a front wall connecting the inner sidewall and the outer sidewall, the front wall is joined to a rear face portion of the side sill, the outer sidewall of the mounting bracket is joined to an extended portion of the side sill, and the inner sidewall of the mounting bracket is joined to the outer sidewall of the side member.

Moreover, according to the present invention, in the trailing arm mounting structure, a reinforcement for the mounting bracket for the trailing arm is joined to a bottom face of the side member and joined to the inner sidewall of the mounting bracket for the trailing arm, and one end portion of a swing pivot configured to support the base end portion of the trailing arm is inserted into and supported on a joint surface between the reinforcement and the inner sidewall of the mounting bracket.

Furthermore, according to the present invention, in the trailing arm mounting structure, a rear wheel house front reinforcement being joined to a rear wheel house is joined to outside of the mounting bracket for the trailing arm.

According to first aspect, both of the side faces in the width direction of the mounting bracket for the trailing arm are supported by the side wall of the side member and the inner sidewall of the side sill. Hence it is possible to ensure mounting rigidity. Moreover, it is possible to reduce the distance in the vertical direction between the trailing arm pivot and the bottom face of the side member and thereby to suppress displacement of the trailing arm pivot. In this way, the trailing arm can be reliably supported. Hence it is possible to improve running stability, to prevent vibration propagation from a road face, and to reduce noise in a vehicle interior.

According to second aspect, the mounting bracket for the trailing arm has a rigid U-shape while the outer sidewall of the side member, the rear face of the side sill, and the extended portion of the side sill collectively forma substantially U-shape. Then, both of the U-shapes are attached to each other by using respective faces. Hence it is possible to improve mounting rigidity of the mounting bracket for the trailing arm.

According to third aspect, supporting rigidity of the mounting bracket for the trailing arm and the inside of the trailing arm link (the trailing arm pivot) is improved. Hence it is possible to reduce displacement of the pivot.

According to fourth aspect, it is possible to disperse the load applied to the mounting bracket for the trailing arm and the outside of the trailing arm shaft on the rear wheel house. Hence it is possible to improve mounting rigidity of the mounting bracket for the trailing arm and to improve supporting rigidity of the pivot, thereby reducing displacement of the pivot.

DETAILED DESCRIPTION OF PREFERRED EMBODIMENTS

Next, an embodiment of the present invention will be described below in detail with reference to the accompanying drawings.

Figure 1:
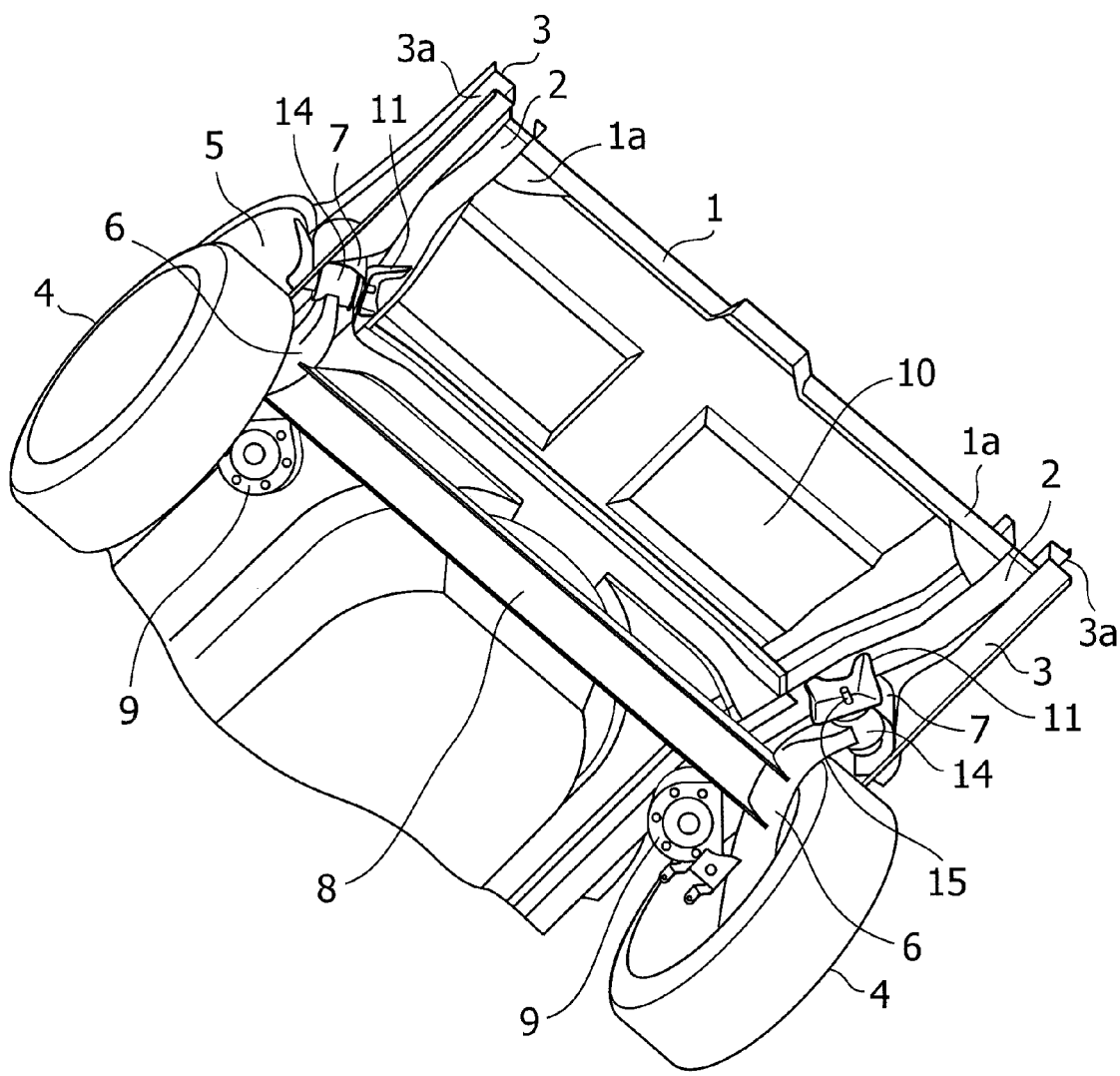
FIG. 1 is a perspective view of a trailing arm mounting structure according to the present invention, which is viewed from underneath a vehicle.

In a vehicle according to this embodiment shown in FIG. 1 to FIG. 3, a pair of right and left rear floor side members (hereinafter referred to as the side members) 2 are arranged on a rear lower face of a vehicle body 1 along a front and rear direction of the vehicle body 1. Side sills 3 are provided on right and left side lower sides 1a corresponding to door openings of the vehicle body 1 along the front and rear direction of the vehicle body 1. Side body outer panels (not shown) are arranged outside the side sills 3 so as to form side faces of the vehicle body 1.

Arch-shaped wheel houses 5 are provided on a rear side of the side sills 3 so as to cover above rear wheels 4. The rear wheels 4 are suspended by trailing arm suspensions. Here, trailing arms 6 for supporting the rear wheels 4 are supported swingably in a vertical direction by mounting brackets 7 for trailing arms mounted on the vehicle body 1. Intermediate positions of the right and left trailing arms 6 are connected to each other by a connecting member 8, and are supported by the side members 2 via buffer devices (not shown) of which lower ends are attached to spring seats 9 attached on the rear side. Each of the buffer devices is formed of a spring and a shock absorber which are not illustrated herein, and an upper end of the buffer device is supported either by the side member or by the wheel house 5.

Each of the side members 2 is made of an elongated steel material having a cross section of a substantially square or rounded U-shape. The side members 2 are arranged on right and left lower faces of a floor panel 10 along the front and rear direction of the vehicle body 1. The side sills 3 are arranged on outer side faces of these side members 2 along the front and rear direction of the vehicle body 1 while providing openings 3a on the outer face sides. Moreover, as shown in FIG. 2, an inner panel rear end portion 3b of each of the side sills 3 is once swelled inward of the vehicle body 1. Then a rear part of a swelled portion 3c thus formed is gradually inclined toward the outside of the vehicle body so as to reduce the width, thereby forming a rear face portion 3d. Thereafter a tip of this rear face portion 3d is extended for a predetermined length L1 toward the rear side of the vehicle body to form an extended portion 3e. A curved portion 2a is formed on a rear side of the side member 2 facing an inner sidewall 3f of the inner panel rear end extended portion 3e of the side sill 3, such that the curved portion 2a slightly comes close to the inside of the vehicle body. A clearance L2 is formed between a rear outer sidewall 2b of this curved portion 2a and the inner sidewall 3f of the inner panel rear end extended portion 3e of the side sill 3. The mounting bracket 7 for the trailing arm 6 is disposed at this clearance L2 and is fitted between the rear face portion 3d of the side sill 3 and the inner sidewall 3f of the inner panel rear end extended portion 3e and the rear outer sidewall 2b of the curved portion 2a of the side member 2 by spot welding and the like.

A reinforcement 11 configured to reinforce the mounting bracket 7 for the trailing arm 6 is joined to a bottom (lower) face 2c of the side member 2. This reinforcement 11 is formed into a substantially square U-shape in cross section, which is joined to the side member 2 via a flat face portion 11b.

The mounting bracket 7 for the trailing arm 6 includes a pair of side walls 7a and 7b opposed to each other, and a front wall 7c connected to ends on the same side of these side walls 7a and 7b so as to collectively form a cross section of a substantially square or rounded U-shape. The front wall 7c of this mounting bracket 7 for the trailing arm 6 is disposed close to the rear face portion 3d of the side sill 3. Meanwhile, the two side walls 7a and 7b are disposed in the clearance L2 between the rear outer sidewall 2b of the curved portion 2a of the side member 2 and the inner sidewall 3f of the inner panel rear end extended portion 3e of the side sill 3, and are joined and attached thereto by means of spot welding and the like.

The inner sidewall 7a of the mounting bracket 7 is joined to the rear outer sidewall 2b of the curved portion 2a of the side member 2 and to an outer sidewall 11a of the reinforcement 11 having the square U-shape. The outer sidewall 7b of the mounting bracket 7 is joined to the inner sidewall 3f of the inner panel rear end extended portion 3e of the side sill 3. Meanwhile, the front wall 7c of the mounting bracket 7 is joined to the rear face portion 3d of the side sill 3.

Figure 4:
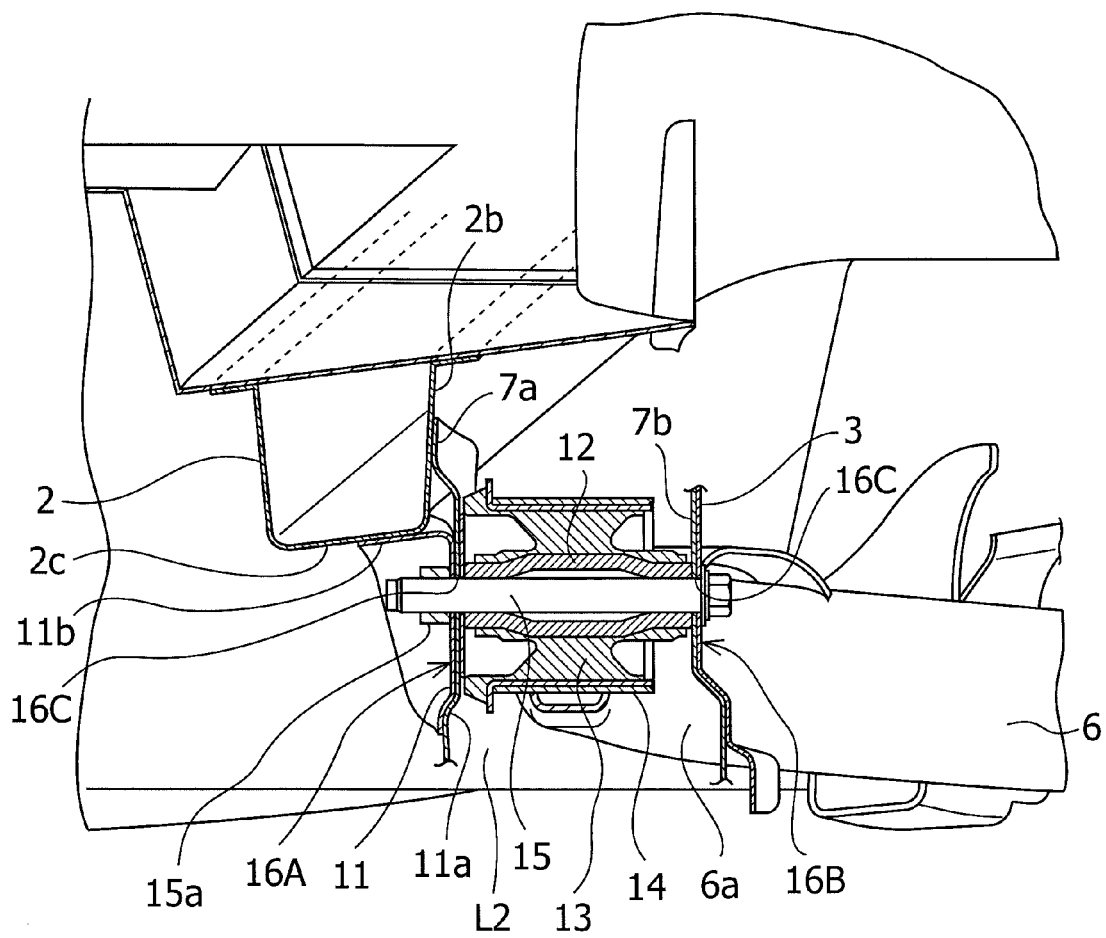
FIG. 4 is a partial cross-sectional view showing a trailing arm mounting portion.

As shown in FIG. 4, a cylindrical spacer 12 is disposed in the center of a base end portion 6a of the trailing arm 6, and a trailing arm link 14 is provided coaxially around this spacer 12 while interposing a cylindrical bush 13. This trailing arm link 14 is fitted in the mounting bracket 7 for the trailing arm 6 by way of a mounting bolt (a swing pivot) 15 inserted along an axial line of the spacer 12, and is supported swingably in the vertical direction by a nut 15a.

Figure 2:
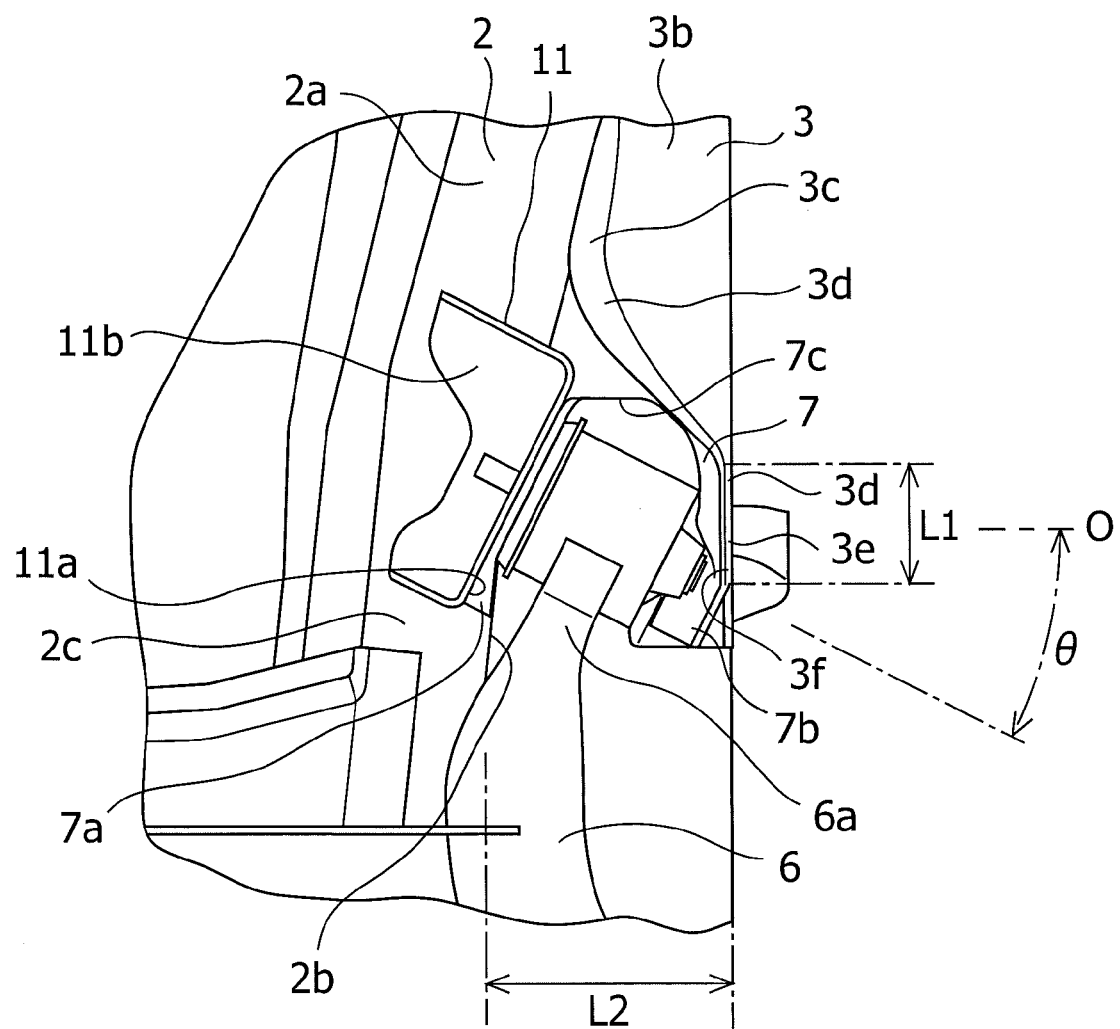
FIG. 2 is an enlarged perspective view of a substantial part of FIG. 1.
Figure 3:
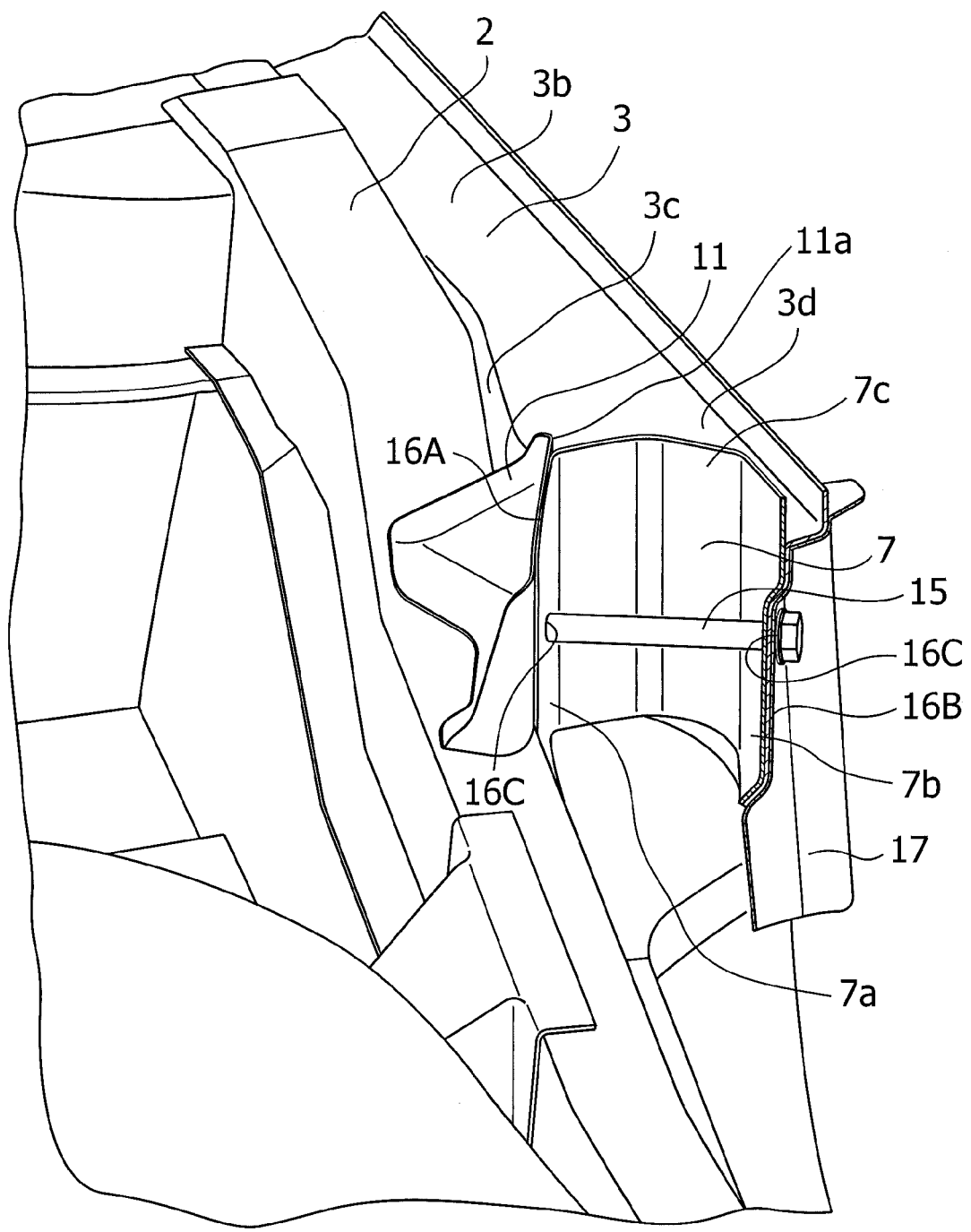
FIG. 3 is a perspective view showing a mounting bracket for a trailing arm and a trailing arm pivot.

As shown in FIG. 2, the mounting bolt 15 is inserted while being inclined at a predetermined angle θ in a plan view relative to a central axis O along the vehicle width direction, and the base end portion 6a of the trailing arm 6 is attached while being oriented inward of the vehicle body 1. The trailing arm 6 is formed while being curved into an arc shape and a tip end 6b of the trailing arm 6 is formed while being curved outward of the vehicle body and is fixed to a bearing of the rear wheel 4 in a direction intersecting with the base end portion 6a.

A rear wheel house front reinforcement 17, which is joined to the rear wheel house 5, is joined to outside of the mounting bracket 7 for the trailing arm 6 by spot welding and the like.

Bolt holes 16C are formed on a joint portion 16A between the outer sidewall 11a of the reinforcement 11 and the side wall 7a of the mounting bracket 7 for the trailing arm 6 and on a joint portion 16B between the side wall 7b of the mounting bracket 7 for the trailing arm 6 and the rear wheel house front reinforcement 17 while interposing the inner sidewall 3f of the extended portion 3e of the side sill 3. The mounting bolt 15 is inserted into these bolt holes 16C and the nut 15a is screwed thereon. Hence the trailing arm link 14 is swingably supported by the mounting bracket 7.

Procedures for mounting the mounting bracket 7 for the trailing arm 6 and procedures for mounting the trailing arm link 14 will now be described. The front wall 7c of the mounting bracket 7 for the trailing arm 6 is disposed near the rear face portion 3d of the side sill 3. Meanwhile, the two side walls 7a and 7b are disposed in the clearance L2 between the rear outer sidewall 2b of the curved portion 2a of the side member 2 provided with the reinforcement 11 and the inner sidewall 3f of the extended portion 3e of the side sill 3. Then, the mounting bracket 7 is joined to the reinforcement 11, the rear outer sidewall 2b of the curved portion 2a of the side member 2, and the inner sidewall 3f of the extended portion 3e of the side sill 3 by spot welding and the like.

Thereafter, the mounting bolt 15 is inserted into the bolt holes 16C which are formed on the joint portion 16A between the outer sidewall 11a of the reinforcement 11 and the side wall 7a of the mounting bracket 7 for the trailing arm 6 and on the joint portion 16B between the side wall 7b of the mounting bracket 7 for the trailing arm 6 and the rear wheel house front reinforcement 17 while interposing the inner sidewall 3f of the extended portion 3e of the side sill 3. Hence the trailing arm link 14 is swingably supported.

According to the above-described embodiment, the clearance L2 is formed between the outer side wall 2b of the side member 2 and the inner sidewall 3f of the extended portion 3e of the side sill 3. The mounting bracket 7 for the trailing arm 6 is disposed in this clearance L2. Moreover, the inner sidewall 7a of the mounting bracket 7 for the trailing arm 6 is attached to the outer sidewall 2b of the side member 2, and the outer sidewall 7b of the mounting bracket 7 for the trailing arm 6 is attached to the inner sidewall 3f of the extended portion 3e of the side sill 3. Then, the base end portion 6a of the trailing arm 6 is supported between the inner sidewall 7a and the outer sidewall 7b of the mounting bracket 7 for the trailing arm 6. Hence, the trailing arm link 14 can be disposed between the side member 2 and the rear end of the side sill 3. Accordingly, it is possible to set up a mounting position of the mounting bolt 15 for supporting the trailing arm link 14 of the trailing arm 6 in a position slightly lower than a position of the lower face 2c of the side member 2. In this way, it is possible to achieve size reduction and weight saving of the mounting bracket 7 for the trailing arm 6 while ensuring rigidity of a supporting portion of the trailing arm link 14. Since the mounting position of the trailing arm link 14 can be set higher, it is not necessary to set the rear end portion of the side member 2 higher by bending the rear end portion thereof upward. Hence it is possible to form the side member straight. Since the mounting bracket 7 for the trailing arm 6 can be fitted between the outer sidewall 2b of the side member 2 and the inner sidewall 3f of the extended portion 3e of the side sill 3, it is possible to obtain sufficient rigidity and thereby to achieve size reduction and weight saving by downsizing the cross section of the side member 2.

Moreover, the mounting bracket 7 for the trailing arm 6 is formed into the substantially square U-shape by use of the wall 7c on the front side of the vehicle body, the inner sidewall 7a, and the outer sidewall 7b. Then, the wall 7c on the front side of the vehicle body 1 is joined to the rear face portion 3d of the side sill 3. At the same time, the outer sidewall 7b is joined to the inner sidewall 3f of the extended portion 3e of the side sill 3 and the inner sidewall 7a is joined to the outer sidewall 2b of the side member 2. Hence it is possible to improve mounting rigidity of the mounting bracket 7 for the trailing arm 6.

Furthermore, the reinforcement 11 for the mounting bracket 7 for the trailing arm 6 is joined to the bottom face 2c of the side member 2 and to the inner sidewall 7a of the mounting bracket 7 for the trailing arm 6, and one end of the mounting bolt 15 configured to support the base end portion 6a of the trailing arm 6 is inserted into and supported on the joint portion 16A between the reinforcement 11 and the inner sidewall 7a of the mounting bracket 7. Thus, supporting rigidity of the mounting bracket 7 for the trailing arm 6 and the inside of the trailing arm link 14 (the trailing arm pivot) can be improved. Hence it is possible to reduce displacement of the pivot.

The rear wheel house front reinforcement 17 being joined to the rear wheel house 5 is joined to the outside of the mounting bracket 7 for the trailing arm 6. Thus, it is possible to disperse the load applied to the mounting bracket 7 for the trailing arm 6 and the outside of the trailing arm shaft on the rear wheel house 5. Hence it is possible to improve mounting rigidity of the mounting bracket 7 for the trailing arm 6 and to improve supporting rigidity of the pivot, thereby reducing displacement of the pivot.

It is to be understood that the present invention is not limited to only the above-described embodiment. For example, the size reduction and weight saving by downsizing the cross section of the side member 2 can also be achieved by reducing the width or height of the side member 2 by changing the thickness or the material as appropriate. Meanwhile, as for the shape of the mounting bracket 7 for the trailing arm 6, it is possible to employ the square U-shape, the rounded U-shape, or any other shapes so as to correspond to the shapes of the side member 2 and the side sill 3 or the shape of the clearance L2. The reinforcement 11 may also employ any other shapes as long as the reinforcement 11 includes a side surface portion having a U-shape other than the face to be joined to the side member 2. Moreover, the plate thickness of the reinforcement 11 is selectable as appropriate. Similarly, of course various other modifications are possible without departing from the scope of the present invention.

EXPLANATION OF REFERENCE NUMERALS

1 VEHICLE BODY
2 SIDE MEMBER
3 SIDE SILL
4 REAR WHEEL
5 REAR WHEEL HOUSE
6 TRAILING ARM
7 MOUNTING BRACKET
11 REINFORCEMENT
14 TRAILING ARM LINK
15 MOUNTING BOLT
17 REAR WHEEL HOUSE FRONT REINFORCEMENT
2b OUTER SIDEWALL
3e EXTENDED PORTION
3f INNER SIDEWALL
6a BASE END PORTION

7a INNER SIDEWALL
7b OUTER SIDEWALL
L2 CLEARANCE

What is claimed is:

1. A trailing arm mounting structure comprising:
a trailing arm; and
a mounting bracket for the trailing arm, the mounting bracket being configured to swingably support a base end portion of the trailing arm, the mounting bracket being supported by a side member and a side sill of a vehicle body,
wherein a clearance is formed between an outer sidewall of the side member and an inner sidewall of the side sill,
an inner sidewall of the mounting bracket for the trailing arm is attached to an outer sidewall of the side member while the mounting bracket for the trailing arm is disposed in the clearance,
an outer sidewall of the mounting bracket for the trailing arm is attached to the inner sidewall of the side sill,
the base end portion of the trailing arm is supported between the inner sidewall and the outer sidewall of the mounting bracket for the trailing arm,
the mounting bracket for the trailing arm is formed into a substantially U-shape by using the inner sidewall, the outer sidewall, and a front wall connecting the inner sidewall and the outer sidewall,
the front wall is joined to a rear face portion of the side sill,
the outer sidewall of the mounting bracket is joined to an extended portion of the side sill, and
the inner sidewall of the mounting bracket is joined to the outer sidewall of the side member.

2. The trailing arm mounting structure according to claim 1,
wherein a reinforcement for the mounting bracket for the trailing arm is joined to a bottom face of the side member and joined to the inner sidewall of the mounting bracket for the trailing arm, and
one end portion of a swing pivot configured to support the base end portion of the trailing arm is inserted into and supported on a joint surface between the reinforcement and the inner sidewall of the mounting bracket.

3. The trailing arm mounting structure according to claim 1,
wherein a rear wheel house front reinforcement being joined to a rear wheel house is joined to outside of the mounting bracket for the trailing arm.

4. The trailing arm mounting structure according to claim 1,
wherein a reinforcement for the mounting bracket for the trailing arm is joined to a bottom face of the side member and joined to the inner sidewall of the mounting bracket for the trailing arm, and
one end portion of a swing pivot configured to support the base end portion of the trailing arm is inserted into and supported on a joint surface between the reinforcement and the inner sidewall of the mounting bracket.

5. The trailing arm mounting structure according to claim 1,
wherein a rear wheel house front reinforcement being joined to a rear wheel house is joined to outside of the mounting bracket for the trailing arm.

* * * * *